(12) United States Patent
Love

(10) Patent No.: US 8,118,919 B1
(45) Date of Patent: Feb. 21, 2012

(54) AIR FILTER AND METHOD OF CONSTRUCTING SAME

(76) Inventor: George W. Love, Baltimore, MD (US)

( * ) Notice: Subject to any disclaimer, the term of this patent is extended or adjusted under 35 U.S.C. 154(b) by 353 days.

(21) Appl. No.: 12/288,797

(22) Filed: Oct. 23, 2008

Related U.S. Application Data

(60) Provisional application No. 61/005,572, filed on Dec. 6, 2007.

(51) Int. Cl.
*B01D 46/00* (2006.01)

(52) U.S. Cl. .................. 95/286; 55/486; 55/528

(58) Field of Classification Search ............ 55/527, 55/318, 482–489; 95/273–287; 96/4–14
See application file for complete search history.

(56) References Cited

U.S. PATENT DOCUMENTS

| | | | | |
|---|---|---|---|---|
| 2,813,981 A | * | 11/1957 | Friedman | 250/372 |
| 3,274,759 A | * | 9/1966 | Bell, Jr. | 55/482 |
| 3,443,366 A | * | 5/1969 | Schwab | 55/309 |
| 3,675,402 A | * | 7/1972 | Weed | 55/496 |
| 6,044,892 A | * | 4/2000 | Epstein | 160/380 |
| 6,540,807 B1 | * | 4/2003 | Kawaguchi et al. | 55/524 |

* cited by examiner

*Primary Examiner* — Duane Smith
*Assistant Examiner* — Thomas McKenzie
(74) *Attorney, Agent, or Firm* — Phillips Murrah PC; Martin G. Ozinga

(57) ABSTRACT

An air filter comprising natural and or man made organza wherein the organza allows air to pass but prevents undesirable air particulates to pass and wherein the organza may be disposed over a frame and may include other mesh material.

2 Claims, 1 Drawing Sheet

AIR FILTER AND METHOD OF CONSTRUCTING SAME

CROSS-REFERENCE TO RELATED APPLICATIONS

Figure 1:
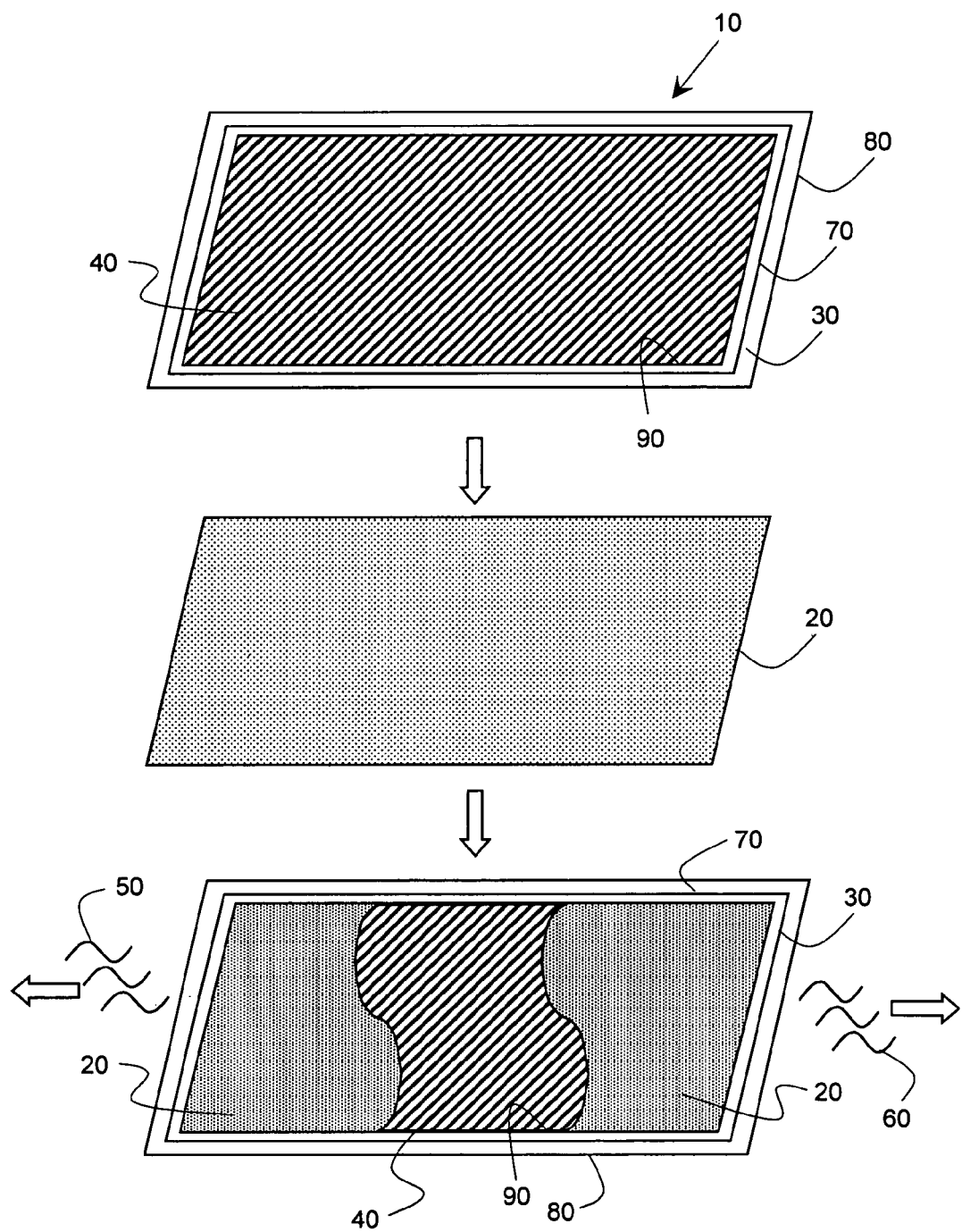

Priority is claimed from provisional patent application U.S. Ser. No. 61/005,572 filed on Dec. 6, 2007 and incorporated by reference herein.

BACKGROUND OF THE INVENTION

1. Field of the Invention

In general, the present invention relates to an air filter or screen. More particularly, the present invention relates to a new and improved filter and or screen utilizing natural or man made organza material fitted to cover apertures such as but not limited to windows.

2. Description of the Prior Art

For purposes of decreasing energy use, it is found that it is more practical, economical, and environmentally friendly to use windows to circulate air when allowable than to constantly run heating and air conditioning systems. In the world today, it is increasingly more favorable to use non-energy required systems such as windows to allow air flow into such buildings as homes and businesses as opposed to energy consuming devices that accomplish the same goal as using an open window.

One of the obvious drawbacks to window use today is the lack of desirable air filtering associated with an open window. This can be a significant shortcoming depending on the air quality in the community, health needs of individuals, location of windows, and so forth. Obviously, depending on the air quality, it would never be desirable to use an open window for air circulation if the air could not be filtered in some way.

In modern construction today, it is common for windows to be fitted with mesh wire or mesh plastic screens to allow air to pass through the open window while preventing such things as insects from also passing through. The mesh or screens are generally configured from intersecting or crossed lines at perpendicular angles with a desired density that allow for viewing through the window as well as act as a screen. These typical mesh constructions are configured for preventing insects from passing, but not configured for preventing smaller or finer items such as pollen, dust and so forth. It is understood that the denser the mesh or screen, the smaller the items are prevented from passing through, but also the less ability to see through the window.

It is also known to provide air filters for such things as air conditioners and heating systems, but these are not typically used in association with windows where it is desirable to have viewing or light pass through. By example, these filters are provided specifically to clean air, but are essentially worthless if the air conditioner or heating system is not on—such as when windows are opened in place of running air conditioning or heating systems.

Due to the varied needs and uses, the prior art devices have failed to provide an adequate solution to air filtering for window wherein visibility is still sufficiently allowed. Today, the current consuming industry is looking for an easily installed, durable, and cost effective air filter for window. Thus, there is a need for a new and improved air filter for windows and the current invention provides a superior solution where the prior art fails.

SUMMARY OF THE INVENTION

In view of the foregoing disadvantages inherent in the known types of screens and air filters now present in the prior art, the present invention provides a convenient, easily installed, and durable construction. As such, the general purpose of the present invention, which will be described subsequently in greater detail, is to provide a new and improved air filter and method of constructing the same which has all the advantages of the prior art and none of the disadvantages.

It is contemplated that the invention may take an existing frame or structure, such as but not limited to a screen for a window, and provide an air filter made of either natural or man made organza material. It is contemplated that the air filter organza material may be attached in numerous configurations and used in numerous applications wherein it is desirable to provide an air filter that allows for visibility.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved air filter made from organza material and method of constructing the same where the prior art fails.

It is a further object of the present invention to provide a new and improved air filter made from organza material which is of a durable and reliable construction and may be easily and efficiently manufactured and marketed.

An even further object of the present invention is to provide a new and improved air filter made from organza material and method of constructing the same which is susceptible to a low cost of construction with regard to both materials and labor, and which accordingly is then susceptible to low prices of sale to the consuming public, thereby making such invention economically available to those in the field and public in general.

Still another object of the present invention is to provide a new and improved air filter made from organza material and method of constructing the same which provides all of the advantages of the prior art, while simultaneously overcoming some of the disadvantages normally associated therewith.

While still another object of the present invention is to provide a new and improved air filter made from organza material and method of constructing the same which allows air filtration while also allowing for unobstructed or near unobstructed viewing through a window where desired.

It is a further object of the present invention to provide a new and improved air filter made from organza material and method of constructing the same which provides a viable alternative for air circulation for buildings and homes that does not require energy typically associated with air flow circulation such as provided by heating and air conditioning systems but still provides filtration as desired.

Furthermore, it is a further object of the present invention to provide a new and improved air filter made from organza material and method of constructing the same that may be utilized with current window screens already in use as well as for new window screens.

Still furthermore, it is a further object of the present invention to provide a new and improved air filter made from organza material that may also provide desired shading and or color for windows.

Yet another object of the present invention is to provide a new and improved portable air filter made from organza material and method of constructing the same that may be removably secured to windows as desired.

It is a further object of the present invention to provide a new and improved air filter made from organza material and method of constructing the same that allows for cleaning and or disposal.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

The present invention referred to throughout may be embodied in other specific forms without departing from its spirit or essential characteristics. The described embodiments are to be considered in all respects only as illustrative and not restrictive. Furthermore, each of the methods that have been described should also be considered only as illustrative and not restrictive.

BRIEF DESCRIPTION OF THE PICTORIAL ILLUSTRATIONS GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, exhibits and appendices wherein:

FIG. 1 is a partially exploded illustration of a preferred embodiment of the invention essentially depicting a screen and frame assembly, a filter such as but not limited to organza, and an assembly therewith.

DETAILED DESCRIPTION OF THE PREFERRED EMBODIMENTS

Referring now to the drawings, wherein like reference numerals designate corresponding structure throughout the views, and referring in particular to FIG. 1, reference numeral 10 generally refers to a new and improved air filter made from organza material, method of construction, and combinations thereof (hereinafter referred to collectively as invention 10) in accordance with the present invention.

Invention 10 may utilize a filtration material 20 such as but not limited to organza. Typically, organza is a thin, plain weave, sheer fabric traditionally made from silk, the continuous filament of silkworms. Currently, the most luxurious organzas are still woven in silk although many organzas are now man made and woven with synthetic filament fibers such as polyester or nylon. Organza is typically sheer and can be nearly completely see through, partially see through, and or non-see through. It is contemplated that the current invention may use various density and ability to see through the material as desired. It is understood that organza may be of tight weave to allow air to flow through, but stop or catch other non desirable air particulates such as dust, pollen, and so forth.

In a preferred construction, invention 10 may utilize a frame 30 wherein filtration material 20 is attached and or removably attached. Frame 30 may already be utilized to hold a screen or mesh 40 known in the art. It is contemplated that numerous configurations or frames may be utilized to hold filtration material 20 where desired as well as attaching filtration material 20 directly to the aperture where it is desired to filter air. The illustrations depicting use with the frame 30 should not be considered to limit the invention as such. It is further understood that invention 10 may not utilize screen 40 and that filtration material may just be attached to frame 30.

Furthermore, it is understood that invention 10 may be utilized on windows and openings (not depicted) for homes, buildings, recreational vehicles, camping tents, and so forth. Invention 10 may be further utilized in heating and air conditioning systems that may not have visibility utilizations commonly associated with windows.

It is also understood that filtration material 20 may allow air flow 50 through filtration material 20 such that filtered air 60 is achieved. It is contemplated that air flow in general may flow through either direction and the illustrations should not be considered to limit the application as such.

It is contemplated that filtration material 20 may be utilized wherein an individual may apply filtration material 20 to existing frames 30 utilized in existing structures. It is further understood that invention 10 may not be a retrofit of the existing frame 30 structure, but rather an original construction. It is also contemplated that filtration material 20 may be stapled, tacked, glued, heated, combinations thereof or otherwise fixed to areas where filtration is desired and or shading and or color accents.

In a preferred embodiment, frame 30 may have an outer edge 80 for contacting a window frame, an inner edge 90 generally defining the interior of frame 30, and a binder 70. Binder 70 may include a groove (not shown) in frame 30 wherein a piece of generally elastic material or filler is used to trap or secure screen 40 and filtration material 20 to frame 30. In a preferred construction, screen 40 and filtration material 20 may be stretched across frame 30 generally covering the interior of frame 30 and groove wherein binder 70 is stretched or held in place.

Furthermore, it is also contemplated that a preferred embodiment of the invention may utilize various colors as desired. By example, matching colors of material 20 could be utilized for aesthetic reasons to match home décor, contrast, or further accent.

Changes may be made in the combinations, operations, and arrangements of the various parts and elements described herein without departing from the spirit and scope of the invention.

I claim:

1. An air filter for a house comprising:

organza, wherein the organza is a thin, plain weave, sheer fabric made from natural silk and wherein said organza allows air to pass into said house but prevents undesirable air particulates to pass and wherein the organza is nearly completely see through;

a filter frame wherein said filter frame is positioned within a window opening of said house, the filter frame comprising an inner edge, an outer edge and an inner space defined as the perimeter of the inner edge, wherein the outer edge contacts a frame of said window;

wherein said organza is disposed over said filter frame to completely cover the inner space and is adapted to fit a window of said house; and a pair of first and second plastic mesh screens disposed over said filter frame for keeping insects out of said house, wherein the first screen is positioned upstream from the organza and the second screen is positioned downstream from the organza;

wherein the inner edge of the filter frame comprises a groove containing an elastic material used to secure the screens and organza material to the filter frame.

2. A method of filtering and circulating air in a house, which provides reduced energy usage compared to circulating air via heating and air conditioning systems, comprising:

attaching an air filter to a window frame in said house, wherein the filter provides unobstructed viewing through said window;

allowing air to flow through said filter; wherein the filter comprises:

organza, wherein the organza is a thin, plain weave, sheer fabric made from natural silk and wherein said organza allows air to pass into said house but prevents undesirable air particulates to pass and wherein the organza is nearly completely see through;

a filter frame wherein said filter frame is positioned within a window opening of said house, the filter frame comprising an inner edge, an outer edge and an inner space defined as the perimeter of the inner edge, wherein the outer edge contacts a frame of said window;

wherein said organza is disposed over said filter frame to completely cover the inner space; and a pair of first and second plastic mesh screens disposed over said filter frame for keeping insects out of said house, wherein the first screen is positioned upstream from the organza and the second screen is positioned downstream from the organza;

wherein the inner edge of the filter frame comprises a groove containing an elastic material used to secure the screens and organza material to the filter frame.

* * * * *